United States Patent
Zhang et al.

(10) Patent No.: US 9,302,588 B2
(45) Date of Patent: Apr. 5, 2016

(54) VEHICLE SYSTEM FOR EVALUATING A VOLTAGE CONVERTER

(75) Inventors: Yuan Zhang, Novi, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 160 days.

(21) Appl. No.: 13/537,123

(22) Filed: Jun. 29, 2012

(65) Prior Publication Data

US 2014/0001985 A1    Jan. 2, 2014

(51) Int. Cl.
*H02P 6/12* (2006.01)
*B60L 3/12* (2006.01)
*B60L 3/00* (2006.01)
*B60L 3/04* (2006.01)
*B60L 3/06* (2006.01)

(52) U.S. Cl.
CPC . *B60L 3/12* (2013.01); *B60L 3/003* (2013.01); *B60L 3/04* (2013.01); *B60L 3/06* (2013.01); *B60L 2240/527* (2013.01); *B60L 2240/529* (2013.01)

(58) Field of Classification Search
USPC ............. 363/16, 56.02, 49, 56.05, 58, 65, 70, 363/71, 89, 132, 132.139; 318/139, 254
See application file for complete search history.

(56) References Cited

U.S. PATENT DOCUMENTS

| | | | |
|---|---|---|---|
| 5,266,891 A | 11/1993 | Kumar et al. | |
| 6,351,399 B2 | 2/2002 | Takanashi et al. | |
| 8,040,081 B2 * | 10/2011 | Shimana | B60L 7/003 180/65.285 |
| 8,344,555 B2 * | 1/2013 | Ichikawa | B60K 6/445 307/10.1 |
| 2006/0224360 A1 * | 10/2006 | Kishimoto | B60L 3/0023 702/183 |
| 2008/0141072 A1 | 6/2008 | Kalgren et al. | |
| 2009/0140745 A1 | 6/2009 | Williams et al. | |
| 2010/0244558 A1 * | 9/2010 | Mitsutani | B60K 6/365 307/9.1 |
| 2010/0289336 A1 * | 11/2010 | Sugita | 307/66 |
| 2011/0095603 A1 * | 4/2011 | Lee | B60L 11/1803 307/10.1 |
| 2011/0170318 A1 | 7/2011 | Chen | |
| 2012/0013182 A1 * | 1/2012 | Minegishi | B60K 6/365 307/9.1 |

FOREIGN PATENT DOCUMENTS

JP    2004242375 A  *  8/2004

* cited by examiner

*Primary Examiner* — Paul Ip
*Assistant Examiner* — Said Bouziane
(74) *Attorney, Agent, or Firm* — David B. Kelley; Brooks Kushman P.C.

(57) ABSTRACT

A vehicle is provided with an electric machine and a storage device. The electric machine is configured to provide drive torque and the storage device is configured to supply power to the electric machine. The vehicle includes a variable voltage converter (VVC) that is connected between the storage device and the electric machine. The vehicle also includes a controller that is configured to receive input indicative of a VVC input current and a VVC output voltage. The controller is further configured to selectively disable drive torque responsive to the input.

17 Claims, 8 Drawing Sheets

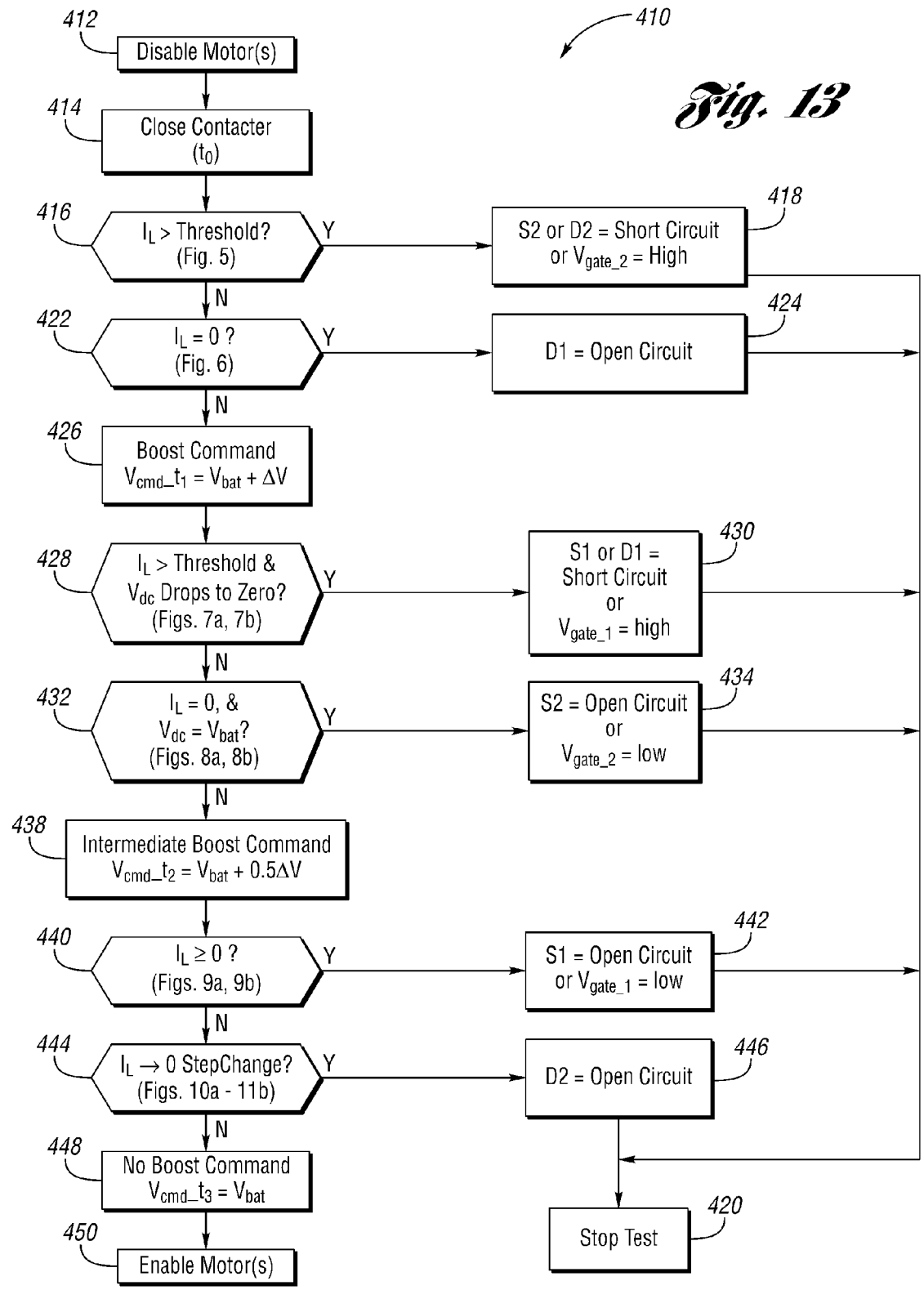

VEHICLE SYSTEM FOR EVALUATING A VOLTAGE CONVERTER

TECHNICAL FIELD

One or more embodiments relate to a vehicle system for evaluating a voltage converter of an electric vehicle prior to vehicle propulsion.

BACKGROUND

The term "electric vehicle" as used herein, includes vehicles having an electric machine for vehicle propulsion, such as battery electric vehicles (BEV), hybrid electric vehicles (HEV), and plug-in hybrid electric vehicles (PHEV). A BEV includes an electric machine, wherein the energy source for the electric machine is a battery that is re-chargeable from an external electric grid. In a BEV, the battery is the source of energy for vehicle propulsion. A HEV includes an internal combustion engine and one or more electric machines, wherein the energy source for the engine is fuel and the energy source for the electric machine is a battery. In a HEV, the engine is the main source of energy for vehicle propulsion with the battery providing supplemental energy for vehicle propulsion (the battery buffers fuel energy and recovers kinematic energy in electric form). A PHEV is like a HEV, but the PHEV has a larger capacity battery that is rechargeable from the external electric grid. In a PHEV, the battery is the main source of energy for vehicle propulsion until the battery depletes to a low energy level, at which time the PHEV operates like a HEV for vehicle propulsion.

Electric vehicles may include a direct current (DC) voltage converter connected between the battery and the electric machine. Such a voltage converter increases or boosts the voltage potential of the electrical power provided to the electric machine and facilitates torque capability optimization. The electric vehicle may also include an inverter connected between the DC voltage converter and the electric machine, when the electric machine is an alternating current (AC) motor.

SUMMARY

In one embodiment, a vehicle is provided with an electric machine that is configured to provide drive torque and a storage device for supplying power to the electric machine. The vehicle includes a variable voltage converter (VVC) that is connected between the storage device and the electric machine. The vehicle also includes a controller that is configured to receive input indicative of a VVC input current and a VVC output voltage. The controller is further configured to selectively disable drive torque in response to the input.

In another embodiment, a vehicle system is provided with a variable voltage converter (VVC) that is connected between a battery and an electric machine. The vehicle system includes at least one controller that is configured to receive input that is indicative of at least one of a VVC input current and a VVC output voltage. The controller is also configured to provide output indicative of VVC performance in response to the input.

In yet another embodiment, a method for evaluating the performance of a variable voltage converter (VVC) connected between a battery and an electric machine is provided. Input is received that is indicative of at least one of a VVC input current and a VVC output voltage, in response to the control signal. Output is provided that is indicative of VVC performance in response to the input.

The vehicle system provides advantages by evaluating the performance of the VVC prior to vehicle propulsion. The vehicle system is configured to identify a specific defective hardware component associated with the VVC. Based on the defective component, the VVC either disables power to the electric machine or activates a limited operating strategy.

BRIEF DESCRIPTION OF THE DRAWINGS

FIG. 11a is an enlarged portion of FIG. 10a;

FIG. 13 is a flow chart illustrating another method for evaluating the performance of a VVC, according to one or more embodiments.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
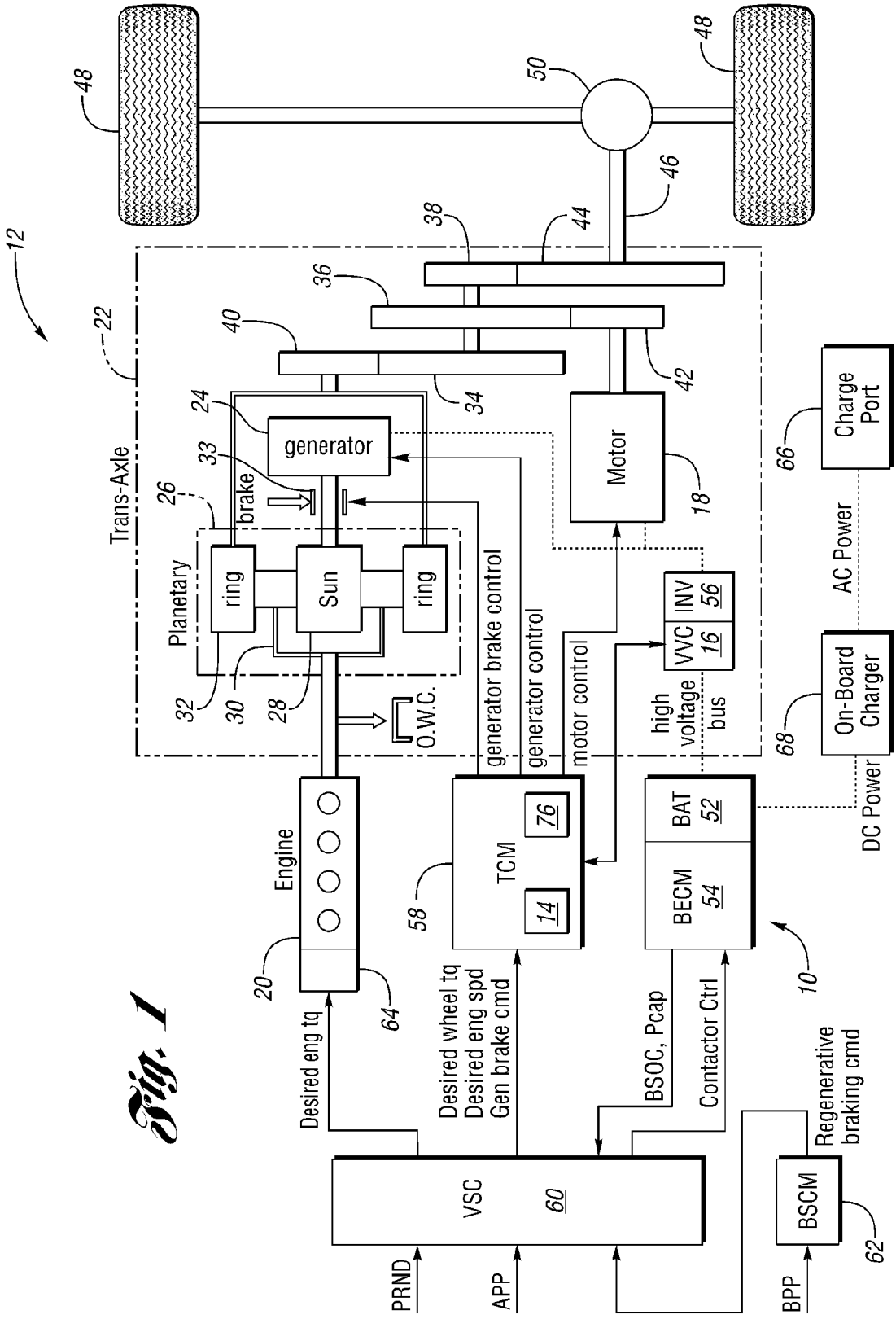
FIG. 1 is a schematic diagram of a vehicle, illustrated with a vehicle system for evaluating the performance of a variable voltage converter (VVC) according to one or more embodiments.

With reference to FIG. 1, a vehicle system for evaluating the performance of a variable voltage converter (VVC) of an electric vehicle is illustrated in accordance with one or more embodiments and is generally referenced by numeral 10. The vehicle system 10 is depicted within a vehicle 12. The vehicle system 10 includes a controller 14 and a VVC 16 that are in communication with each other. The controller 14 receives input signals that represent voltage and current measurements of the VVC 16 and evaluates the performance of the VVC 16 before power is provided for vehicle propulsion.

The illustrated embodiment depicts the vehicle 12 as an HEV, which is an electric vehicle propelled by an electric machine 18 with assistance from an internal combustion engine 20. The electric machine 18 is an AC electric motor according to one or more embodiments, and depicted as the "motor" 18 in FIG. 1. The electric machine 18 receives electrical power and provides drive torque for vehicle propulsion. The electric machine 18 also functions as a generator for converting mechanical power into electrical power through regenerative braking The vehicle 12 includes a transmission 22 having a power-split configuration, according to one or more embodiments. The transmission 22 includes the first electric machine 18 and a second electric machine 24. The second electric machine 24 is an AC electric motor according to one or more embodiments, and depicted as the "generator" 24 in FIG. 1. Like the first electric machine 18, the second electric machine 24 receives electrical power and provides output torque. The second electric machine 24 also functions as a generator for converting mechanical power into electrical power and optimizing power flow through the transmission 22.

The transmission 22 includes a planetary gear unit 26, which includes a sun gear 28, a planet carrier 30 and a ring gear 32. The sun gear 28 is connected to an output shaft of the second electric machine 24 for receiving generator torque. The planet carrier 30 is connected to an output shaft of the engine 20 for receiving engine torque. The planetary gear unit 26 combines the generator torque and the engine torque and provides a combined output torque about the ring gear 32. The planetary gear unit 26 functions as a continuously variable transmission, without any fixed or "step" ratios.

The transmission 22 also includes a one-way clutch (O.W.C.) and a generator brake 33, according to one or more embodiments. The O.W.C. is coupled to the output shaft of the engine 20 to only allow the output shaft to rotate in one direction. The O.W.C. prevents the transmission 22 from back-driving the engine 20. The generator brake 33 is coupled to the output shaft of the second electric machine 24. The generator brake 33 may be activated to "brake" or prevent rotation of the output shaft of the second electric machine 24 and of the sun gear 28. In other embodiments, the O.W.C. and the generator brake 33 are eliminated, and replaced by control strategies for the engine 20 and the second electric machine 24.

The transmission 22 includes a countershaft having a first gear 34, a second gear 36 and a third gear 38. A planetary output gear 40 is connected to the ring gear 32. The planetary output gear 40 meshes with the first gear 34 for transferring torque between the planetary gear unit 26 and the countershaft. An output gear 42 is connected to an output shaft of the first electric machine 18. The output gear 42 meshes with the second gear 36 for transferring torque between the first electric machine 18 and the countershaft. A transmission output gear 44 is connected to a transmission output shaft 46. The transmission output shaft 46 is coupled to a pair of driven wheels 48 through a differential 50. The transmission output gear 44 meshes with the third gear 38 for transferring torque between the transmission 22 and the driven wheels 48.

Although illustrated and described in the context of an HEV 12, it is understood that embodiments of the vehicle system 10 may be implemented on other types of electric vehicles, such as a battery electric vehicle (BEV), which is powered by an electric machine without assistance of an internal combustion engine.

The vehicle 12 includes a battery 52 for storing electrical energy. The battery 52 is a high voltage battery that is capable of outputting electrical power to operate the first electric machine 18 and the second electric machine 24. The battery 52 also receives electrical power from the first electric machine 18 and the second electric machine 24 when they are operating as generators. The battery 52 is a battery pack made up of several battery modules (not shown), where each battery module contains a plurality of battery cells (not shown). Other embodiments of the vehicle 12 contemplate different types of energy storage devices, such as capacitors and fuel cells (not shown) that supplement or replace the battery 52. A high voltage bus electrically connects the battery 52 to the first electric machine 18 and to the second electric machine 24.

The vehicle includes a battery energy control module (BECM) 54 for controlling the battery 52. The BECM 54 receives input that is indicative of vehicle conditions and battery conditions, such as battery temperature, voltage and current. The BECM 54 calculates and estimates battery parameters, such as battery state of charge and the battery power capability. The BECM 54 provides output (BSOC, $P_{cap}$) that is indicative of the BSOC and the battery power capability to other vehicle systems and controllers.

The transmission 22 includes the VVC 16 and an inverter 56. The VVC 16 and the inverter 56 are electrically connected between the main battery 52 and the first electric machine 18; and between the battery 52 and the second electric machine 24. The VVC 16 boosts or "steps up" the voltage potential of the electrical power provided by the battery 52. The inverter 56 inverts the DC power supplied by the main battery 52 (through the VVC 16) to AC power for operating the electric machines 18, 24. The inverter 56 also rectifies AC power provided by the electric machines 18, 24, to DC for charging the main battery 52.

The transmission 22 includes a transmission control module (TCM) 58 for controlling the electric machines 18, 24, the VVC 16 and the inverter 56. The TCM 58 includes the controller 14, which is configured to monitor, among other things, the position, speed, and power consumption of the electric machines 18, 24. The controller 14 also monitors electrical parameters (e.g., voltage and current) at various locations within the VVC 16 and the inverter 56. The TCM 58 provides output signals corresponding to this information to other vehicle systems.

The vehicle 12 includes a vehicle system controller (VSC) 60 that communicates with other vehicle systems and controllers for coordinating their function. Although it is shown as a single controller, the VSC 60 may include multiple controllers that may be used to control multiple vehicle systems according to an overall vehicle control logic, or software.

The vehicle controllers, including the VSC 60 and the controller 14 generally includes any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The VSC 60 communicates with other vehicle systems and controllers (e.g., the BECM 54 and the TCM 58) over one or more hardline vehicle connections using common bus protocols (e.g., CAN and LIN). The VSC 60 receives input (PRND) that represents a current position of the transmission 22 (e.g., park, reverse, neutral or drive). The VSC 60 also receives input (APP) that represents an accelerator pedal position. The VSC 60 provides output that represents a desired wheel torque, desired engine speed, and generator brake command to the TCM 58; and contactor control to the BECM 54.

The vehicle 12 includes a braking system (not shown) which includes a brake pedal, a booster, a master cylinder, as well as mechanical connections to the driven wheels 48, to effect friction braking. The braking system also includes position sensors, pressure sensors, or some combination thereof for providing information such as brake pedal position (BPP) that corresponds to a driver request for brake torque. The braking system also includes a brake system control module (BSCM) 62 that communicates with the VSC 60 to coordinate regenerative braking and friction braking. The BSCM 62 provides a regenerative braking command to the VSC 60, according to one embodiment.

The vehicle 12 includes an engine control module (ECM) 64 for controlling the engine 20. The VSC 60 provides output (desired engine torque) to the ECM 64 that is based on a number of input signals including APP, and corresponds to a driver's request for vehicle propulsion.

The vehicle 12 is configured as a plug-in hybrid electric vehicle (PHEV) according to one or more embodiments. The battery 52 periodically receives AC energy from an external power supply or grid, via a charge port 66. The vehicle 12 also includes an on-board charger 68, which receives the AC energy from the charge port 66. The charger 68 is an AC/DC converter which converts the received AC energy into DC energy suitable for charging the battery 52. In turn, the charger 68 supplies the DC energy to the battery 52 during recharging.

Figure 2:
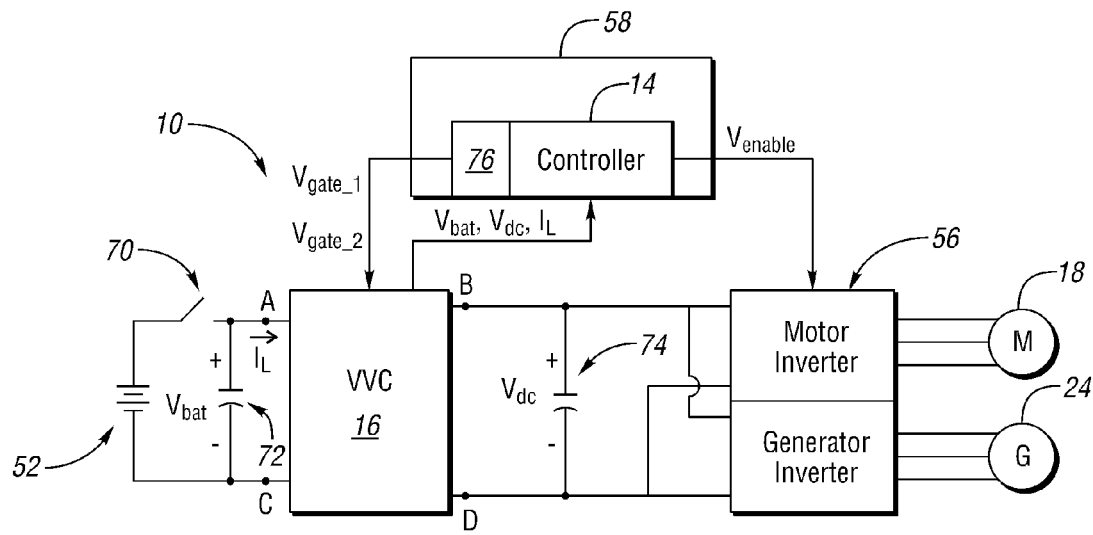
FIG. 2 is an enlarged schematic view of the vehicle system of FIG. 1.

With reference to FIG. 2, the VVC 16 boosts or "steps up" the voltage potential of the electrical power provided by the main battery 52. The main battery 52 provides high voltage (HV) DC power. A contactor 70 is connected in series between the main battery 52 and the VVC 16. When the contactor 70 is closed, the HV DC power may be transferred from the main battery 52 to the VVC 16. An input capacitor 72 is connected in parallel to the main battery 52. The input capacitor 72 stabilizes the bus voltage and reduces any voltage and current ripple. The VVC 16 receives the HV DC power and boosts or "steps up" the voltage potential of the input voltage.

The inverter 56 inverts/rectifies the electrical power between AC and DC. An output capacitor 74 is connected in parallel to the VVC 16 and the inverter 56. The output capacitor 74 stabilizes bus voltage and reduces voltage and current ripple. The inverter 56 includes a bi-directional circuit (not shown) with a series of switches oriented in a three-phase configuration in one or more embodiments. Such a bi-directional circuit is disclosed in U.S. Patent Application Publication No. 2011/0170318 to Chen, and incorporated by reference herein. The inverter 56 includes separate circuitry for controlling each of the first electric machine 18 and the second electric machine 24, which is generally depicted as two inverters in FIG. 2.

The vehicle system 10 includes sensors (not shown) for measuring electrical parameters of the VVC 16. A first voltage sensor (not shown) measures the voltage of the main battery 52 and provides a corresponding input signal ($V_{bat}$) to the TCM 58. In one or more embodiments, the first voltage sensor measures the voltage across the input capacitor 72, which corresponds to the main battery voltage ($V_{bat}$).

A second voltage sensor (not shown) measures the output voltage of the VVC 16 and provides a corresponding input signal ($V_{dc}$) to the TCM 58. In one or more embodiments, the second voltage sensor measures the voltage across the output capacitor 74, which corresponds to the DC bus voltage. A current sensor (not shown) measures the input current supplied to the VVC 16 and provides a corresponding input signal ($I_L$) to the TCM 58.

The TCM 58 controls the output voltage of the VVC 16. The TCM 58 includes the controller 14 and a gate drive circuit 76. The controller 14 receives input from the VSC 60 and other controllers, and determines a desired output voltage of the VVC 16. The controller 14 then provides control signals ($V_{gate}$) to the gate drive circuit 76 that correspond to an output voltage command ($V_{cmd}$). The gate drive circuit 76 amplifies the control signals ($V_{gate}$) and provides amplified control signals ($V_{gate\_1}$, $V_{gate\_2}$) to the VVC 16. The controller 14 monitors the input signals ($V_{bat}$, $V_{dc}$, $V_L$) in response to $V_{gate\_1}$, $V_{gate\_2}$ to evaluate the performance of the VVC 16.

The TCM 58 controls the AC voltage provided to the electric machines 18, 24 by providing a control signal ($V_{enable}$) to the invertor 56 and by controlling $V_{dc}$. The inverter 56 includes a series of switches (not shown). The control signal ($V_{enable}$) includes a gate signal that is provided to each switch for controlling their operation. The TCM 58 is configured to disable the first electric machine 18 and the second electric machine 24 (e.g., by opening the switches within the inverter 56) during evaluation of the VVC 16 to prevent torque production, according to one or more embodiments.

Figure 3:
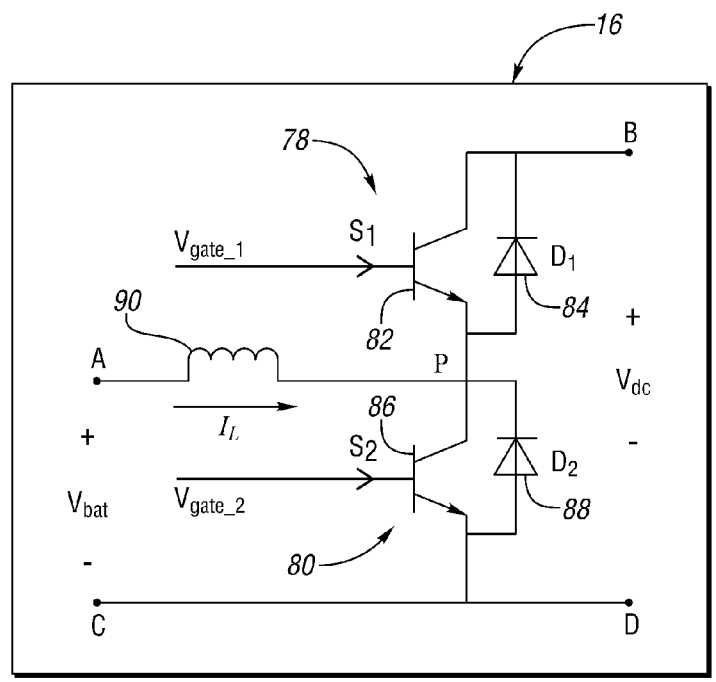
FIG. 3 is a circuit diagram of the VVC of FIGS. 1 and 2, a first switching unit and a second switching unit.

Referring to FIG. 3, the VVC 16 includes a first switching unit 78 and a second switching unit 80 for boosting the input voltage ($V_{bat}$) to provide output voltage ($V_{dc}$). The first switching unit 78 includes a first transistor 82 connected in parallel to a first diode 84, but with their polarities switched (anti-parallel). The second switching unit 80 includes a second transistor 86 connected anti-parallel to a second diode 88. Each transistor 82, 86 may be any type of controllable switch (e.g., an insulated gate bipolar transistor (IGBT) or field-effect transistor (FET)). Additionally, each transistor 82, 86 is individually controlled by the TCM 58. An input inductor 90 is connected in series between the main battery 52 and the switching units 78, 80. The input inductor 90 charges the output capacitor 74.

The TCM 58 controls the output voltage ($V_{dc}$) of the VVC 16. The gate drive circuit 76 provides a control signal ($V_{gate}$) to each transistor 82, 86 that is based on $V_{cmd}$. The gate drive circuit 76 is configured to provide gate signals that correspond to a specific type of voltage change or response at $V_{dc}$ (e.g., a step response, or a ramp response). In one or more embodiments, the transistors 82, 86 are configured to open in response to a high voltage gate signal, and close in response to a low voltage gate signal.

With reference to FIGS. 1-3, the vehicle 12 includes a plurality of controllers (e.g., the VSC 60, the controller 14, the BECM 54, etc.). These vehicle controllers perform a series of tests at vehicle start up, before allowing vehicle propulsion. These tests may be initiated by an input signal, such as "KEY_ON". The KEY_ON signal is generated when the driver turns a key (not shown) to an "on" position (or starts the vehicle 12 by some other procedure). Some tests may be run simultaneously, however other tests are run in series. Therefore, the tests are performed quickly to avoid delaying vehicle propulsion.

Figure 4A:
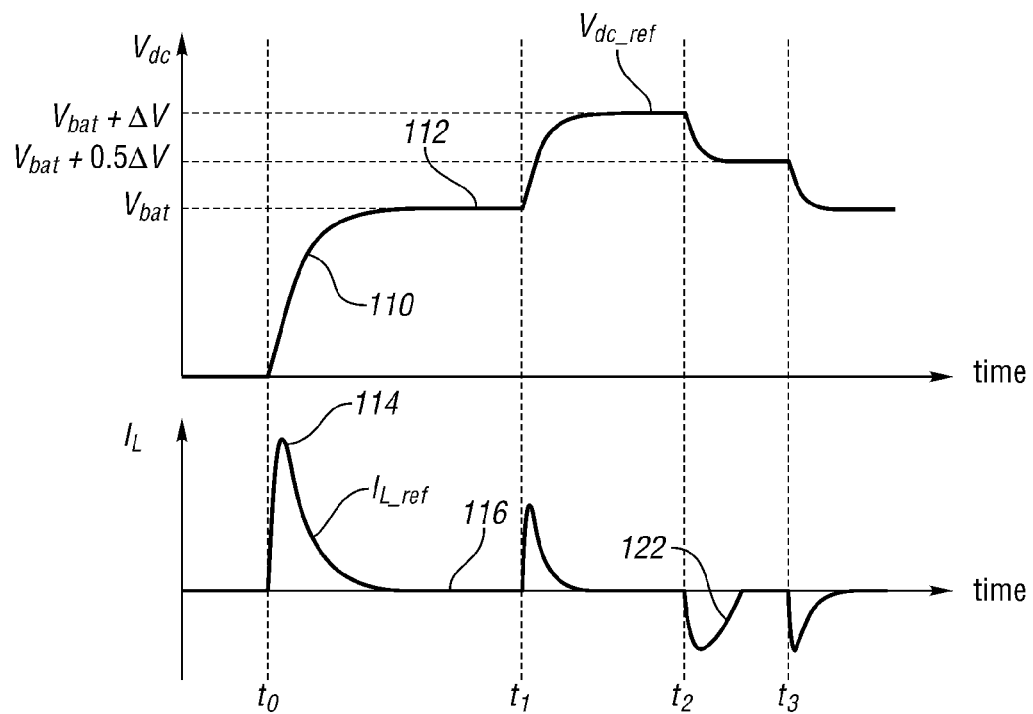
FIG. 4a is a graph of signals measured at the VVC of FIG. 3, illustrating normal operating conditions and step responses.
Figure 4B:
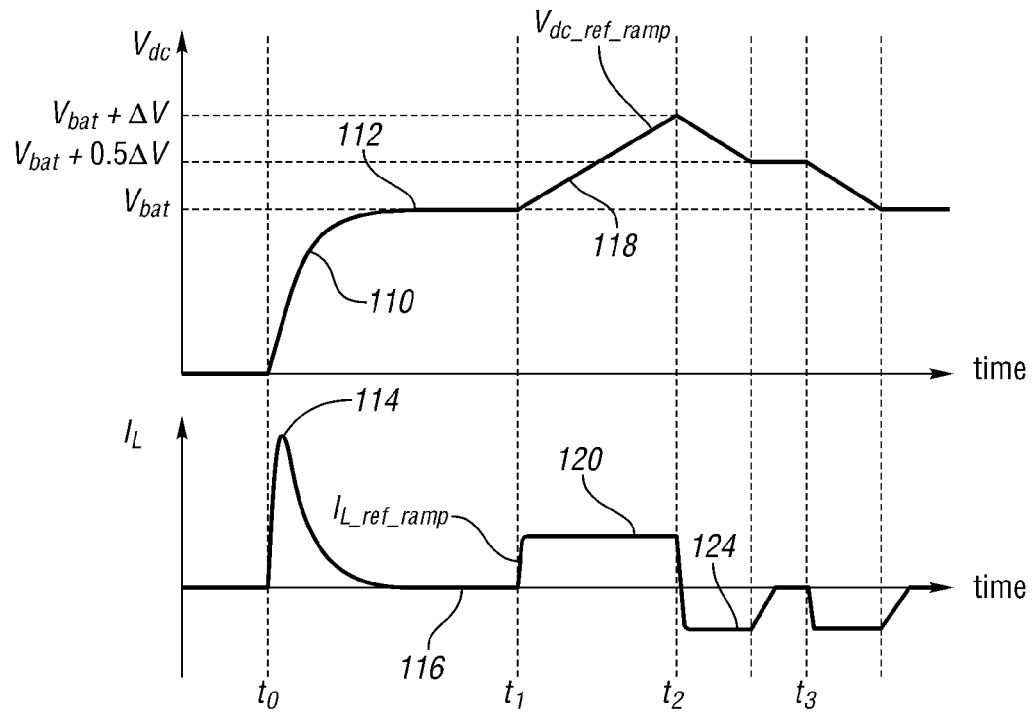
FIG. 4b is a graph of signals measured at the VVC of FIG. 3, illustrating normal operating conditions and ramp responses.

Referring to FIGS. 2-4b, the vehicle system 10 performs a self-test of the VVC 16, at vehicle start up. FIGS. 4a and 4b each depict waveforms of voltage and current measurement data taken over a common period of time, corresponding to normal VVC 16 operation without any defects. These waveforms, and their associated data are stored in the memory of the controller 14 and provide a reference (predetermined data) for evaluating VVC 16 performance. With reference to FIG. 4a, a first waveform illustrates the output voltage ($V_{dc\_ref}$) of the VVC 16, and a second waveform illustrates the input current ($I_{L\_ref}$) measured at the VVC 16. FIG. 4a depicts signals measured at the VVC 16, when the gate drive circuit 76 provides gate signals that correspond to step changes or responses, to the transistors 82, 86. FIG. 4b depicts signals measured at the VVC 16, when the gate drive circuit 76 provides gate signals that correspond to ramp changes or responses, to the transistors 82, 86.

At time ($t_0$), the contactor 70 (FIG. 2) closes and battery power is suddenly provided to the VVC 16. The transistors 82, 86 are initially configured in an open position, which allows current to pass through the first diode 84 without boosting the voltage. The waveforms illustrated in both FIGS. 4a and 4b depict step responses after the battery power is provided to the VVC 16. The transient voltage response of the $V_{dc\_ref}$ and $V_{dc\_ref\_ramp}$ waveforms include a rapid increase from zero Volts to battery voltage ($V_{bat}$), which is referenced by numeral 110. At steady-state, the $V_{dc\_ref}$ and $V_{dc\_ref\_ramp}$ waveforms remain at $V_{bat}$, which is referenced by numeral 112 The transient current response of both the $V_{L\_ref}$ and $V_{L\_ref\_ramp}$ waveforms include an increase in current, which is referenced by numeral 114, followed by a gradual decrease to zero Amps at steady-state, which is referenced by numeral 116. Since the transistors 82, 86 are both open at $t_0$, the waveforms depicted in FIGS. 4a and 4b both illustrate step responses after $t_0$.

At time ($t_1$), the TCM 58 commands the VVC 16 to provide a boost voltage. The TCM 58 provides control signals ($V_{gate\_1}$, $V_{gate\_2}$) to the VVC 16 that correspond to a voltage command value that is greater than the battery voltage by a predetermined voltage difference ($V_{cmd\_t1} = V_{bat} + \Delta V$). FIG. 4a illustrates waveforms when the switching units 78, 80 are provided with gate signals corresponding to step changes, therefore the waveforms again depict step responses after $t_1$. However, FIG. 4b illustrates waveforms when the switching units 78, 80 are provided with gate signals corresponding to ramp changes, therefore the waveforms of FIG. 4b depict ramp responses after $t_1$. DC current is a function of the change in voltage, therefore when $V_{dc\_ref\_ramp}$ is subjected to a ramp change that increases at a constant rate, as referenced by numeral 118, the transient response of the $I_{L\_ref\_ramp}$ waveform is a positive and level curve, as referenced by numeral 120.

At time ($t_2$), the TCM 58 commands the VVC 16 to provide an intermediate boost voltage. The TCM 58 provides control signals ($V_{gate\_1}$, $V_{gate\_2}$) to the VVC 16 that correspond to a voltage command value that is greater than the battery voltage and less than the boost voltage. For example, in one or more embodiments, the intermediate boost voltage corresponds to a voltage value that is halfway between $V_{bat}$ and $\Delta V$, (e.g., $V_{cmd\_t2} = V_{bat} + 0.5 * \Delta V$). However, the vehicle system 10 contemplates other intermediate boost voltage values. This portion of the test evaluates the bi-directional operation of the VVC 16. By decreasing the output voltage, from a boost voltage to an intermediate boost voltage, the input current flows toward the main battery 52, as illustrated by the negative transient response of the $I_{L\_ref}$ and $I_{L\_ref\_ramp}$ waveforms, and referenced by numerals 122 and 124 respectively. FIG. 4a illustrates a step response and FIG. 4b illustrates a ramp response.

At time ($t_3$), the TCM 58 commands the VVC 16 to provide no boost. The TCM 58 provides a control signal ($V_{gate}$) to the VVC 16 that corresponds to a voltage command value that is equal to the battery voltage ($V_{cmd\_t3} = V_{bat}$). This portion of the test also evaluates the bi-directional operation of the VVC 16, and again FIG. 4a illustrates a step response and FIG. 4b illustrates a ramp response.

With reference to FIGS. 5-11b, the controller 14 is configured to detect defective hardware components within the VVC 16. Such defects may include a short circuit or open circuit at each of the transistors 82, 86 and diodes 84, 88. The controller 14 is also configured to detect defects within the gate drive circuit 76 (shown in FIG. 3). For example, the gate drive circuit 76 may be defective and only provide a "high" or a "low" voltage signal. Figures denoted with an "a" suffix (e.g., 7a, 8a, 9a, 10a and 11a) reference FIG. 4a and include waveforms of measurement data taken when the VVC 16 receives gate signals corresponding to step changes. Conversely, figures denoted with a "b" suffix (e.g., 7b, 8b, 9b, 10b and 11b) reference FIG. 4b and include waveforms of measurement data taken when the VVC 16 receives gate signals corresponding to ramp changes.

The vehicle system 10 is configured to provide a thorough evaluation of the VVC 16, and identify many potential defects. The vehicle system 10 may notify the driver and/or disable the vehicle prior to vehicle propulsion. Additionally, the vehicle system 10 is configured to identify a specific defective component, or narrow the number of potential defective components associated with a defect. By identifying the specific defective component, the vehicle system 10 may activate a limited operating strategy, when applicable.

Figure 5:
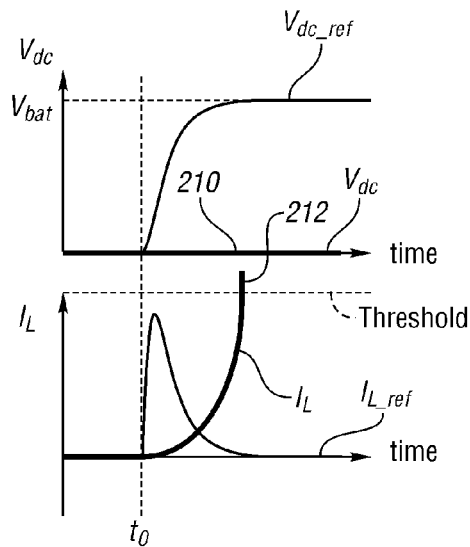
FIG. 5 is a portion of FIG. 4a, illustrated with signals corresponding to an overcurrent condition associated with a short circuit within the second switching unit or a defective gate drive circuit.

The $V_{dc}$ and $I_L$ waveforms illustrated in FIG. 5 are generally indicative of an overcurrent condition associated with a short circuit within the second switching unit 80. The $V_{dc\_ref}$ waveform and the $I_{L\_ref}$ waveform from FIG. 4a are associated with normal operating conditions, and are reproduced in FIG. 5 for reference purposes. At time ($t_0$), the contactor 70 (FIG. 2) closes and battery power is suddenly provided to the VVC 16. The transistors 82, 86 of the switching units 78, 80 (FIG. 3) are initially configured in an open position, which allows current to pass through the first diode 84 without boosting the voltage. However, if there is a short circuit within the second transistor 86 or second diode 88, current will pass through the second switching unit 80 to ground, rather than through the first switching unit 78. Since current does not pass through the first switching unit 78, the voltage response does not change and the $V_{dc}$ waveform remains at zero Volts, which is generally referenced by numeral 210. Since the current now passes through the second switching unit 80 to ground, the current response rises suddenly as depicted by the $I_L$ waveform and referenced by numeral 212. An overcurrent condition may also be associated with defective gate drive circuit 76 that only provides a "high" signal to the second transistor 86, which would have the same effect as a short circuit within the second transistor 86.

Figure 6:
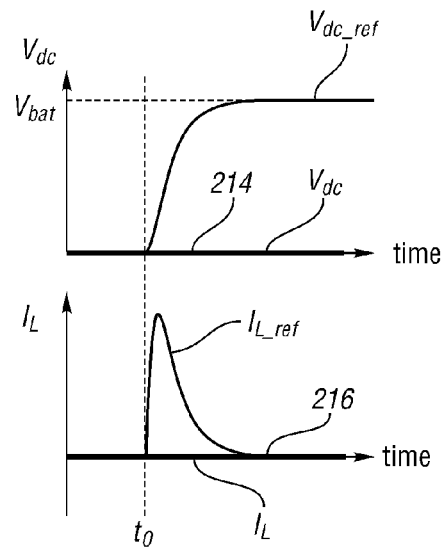
FIG. 6 is a portion of FIG. 4a, illustrated with signals corresponding to an open circuit within a diode of the first switching unit.

FIG. 6 illustrates waveforms ($V_{dc}$ and $I_L$) that are generally indicative of an open circuit within the first diode 84. The waveforms from FIG. 4a are associated with normal operating conditions and are reproduced in FIG. 5 for reference purposes. At time ($t_0$), the contactor 70 (FIG. 2) closes and battery power is suddenly provided to the VVC 16. The transistors 82, 86 of the switching units 78, 80 are initially configured in an open position, which allows current to pass through the first diode 84 without boosting the voltage. However, if there is an open circuit within the first diode 84, current will not pass through the first switching unit 78, rather the current will remain in the main battery 52. Since current does not pass through the first switching unit 78, the voltage response does not change and the $V_{dc}$ waveform remains at zero Volts, as referenced by numeral 214. Since the current remains in the main battery 52, the current response does not change and the $I_L$ waveform remains at zero Amps, as referenced by numeral 216.

Figure 7A:
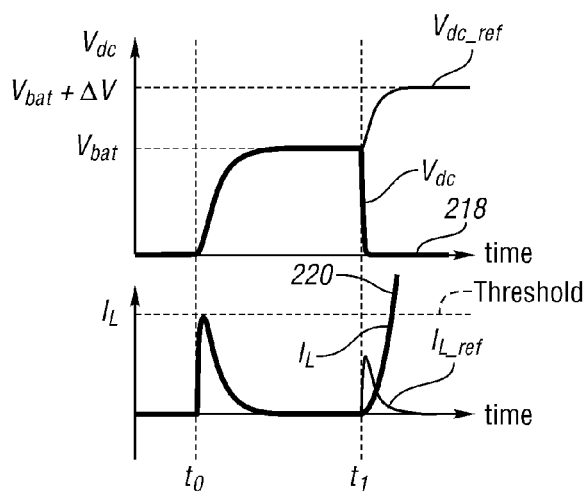
FIG. 7a is a portion of FIG. 4a, illustrated with signals corresponding to a short circuit within the first switching unit or a defective gate drive circuit.
Figure 7B:
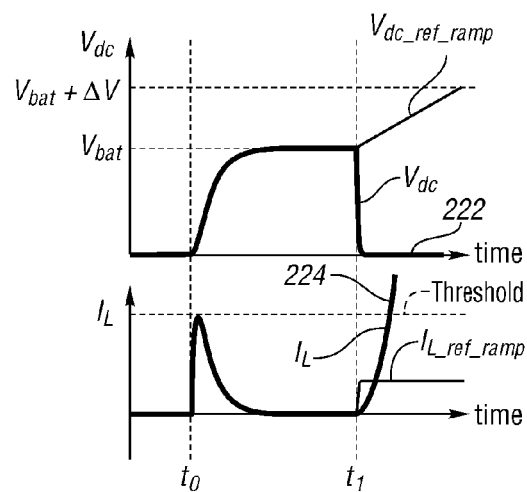
FIG. 7b is a portion of FIG. 4b, illustrated with signals corresponding to a short circuit within the first switching unit or a defective gate drive circuit.

The $V_{dc}$ and $I_L$ waveforms illustrated in FIGS. 7a and 7b are generally indicative of an overcurrent condition associated with a short circuit within the first switching unit 78. The waveforms from FIGS. 4a and 4b are associated with normal operating conditions and are reproduced in FIGS. 7a and 7b, respectively, for reference purposes. At time ($t_1$), the TCM 58 commands the VVC 16 to provide a boost voltage. The TCM 58 provides control signals to the VVC 16 that correspond to a voltage command value that is greater than the battery voltage by a predetermined voltage difference ($V_{cmd\_t1}=V_{bat}+\Delta V$). Under normal operating conditions, the gate drive circuit 76 provides gate signals corresponding to $V_{cmd\_t1}$, which controls the switching units 78, 80 to collectively boost the output voltage as shown in the reference waveforms ($V_{dc\_ref}$ and $V_{dc\_ref\_ramp}$). However, if there is a short circuit within the first transistor 82 or the first diode 84, the $V_{dc}$ waveform decreases to zero Volts, which is generally referenced by numeral 218, the current response rises suddenly as depicted by the $I_L$ waveform and referenced by numeral 220. The $V_{dc}$ and $I_L$ waveforms illustrated in FIG. 7b depict similar responses as those in 7a. The $V_{dc}$ waveform decreases to zero Volts, which is generally referenced by numeral 222, and the $I_L$ waveform rises suddenly, as referenced by numeral 224. Such a condition may also be associated with defective gate drive circuit 76 that only provides a "high" signal to the first transistor 82, which would have the same effect as a short circuit within the first transistor 82.

Figure 8A:
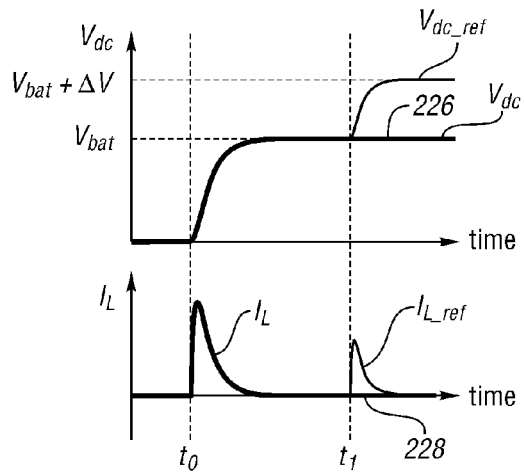
FIG. 8a is a portion of FIG. 4a, illustrated with signals corresponding to an open circuit within a transistor of the second switching unit or a defective gate drive circuit.
Figure 8B:
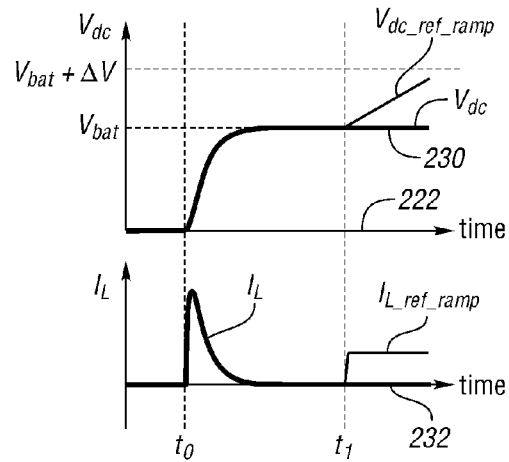
FIG. 8b is a portion of FIG. 4b, illustrated with signals corresponding to an open circuit within a transistor of the second switching unit or a defective gate drive circuit.

FIGS. 8a and 8b illustrate waveforms ($V_{dc}$ and $I_L$) that are generally indicative of an open circuit within the second transistor 86. The waveforms from FIGS. 4a and 4b are associated with normal operating conditions and are reproduced in FIGS. 8a and 8b, respectively, for reference purposes. At time ($t_1$), the TCM 58 commands the VVC 16 to provide a boost voltage. The TCM 58 provides control signals to the VVC 16 that correspond to a voltage command value that is greater than the battery voltage by a predetermined voltage difference ($V_{cmd\_t1}V_{bat}+\Delta V$). Under normal operating conditions, the gate drive circuit 76 provides gate signals corresponding to $V_{cmd\_t1}$, which controls the switching units 78, 80 to collectively boost the output voltage as shown in the reference waveforms ($V_{dc\_ref}$ and $V_{dc\_ref\_ramp}$). However, if there is an open circuit within the second transistor 86, the current will only pass through the first switching unit 78. Since current does not pass through the second switching unit 80, the voltage response does not increase (boost) and the $V_{dc}$ waveform remains at $V_{bat}$, as referenced by numeral 226. Since the voltage does not increase, the current response does not change and the $I_L$ waveform remains at zero Amps, as referenced by numeral 228. The $V_{dc}$ and $I_L$ waveforms illustrated in FIG. 8b depict similar responses as those in 8a. The $V_{dc}$ waveform remains at $V_{bat}$, as referenced by numeral 230, and the $I_L$ waveform remains at zero Amps, as referenced by numeral 232. Such a condition may also be associated with defective gate drive circuit 76 that only provides a "low" signal to the second transistor 86, which would have the same effect as an open circuit within the second transistor 86.

Figure 9A:
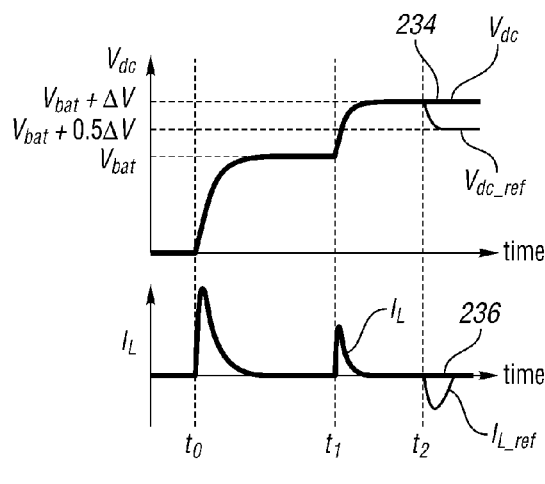
FIG. 9a is a portion of FIG. 4a, illustrated with signals corresponding to an open circuit within a transistor of the first switching unit or a defective gate drive circuit.
Figure 9B:
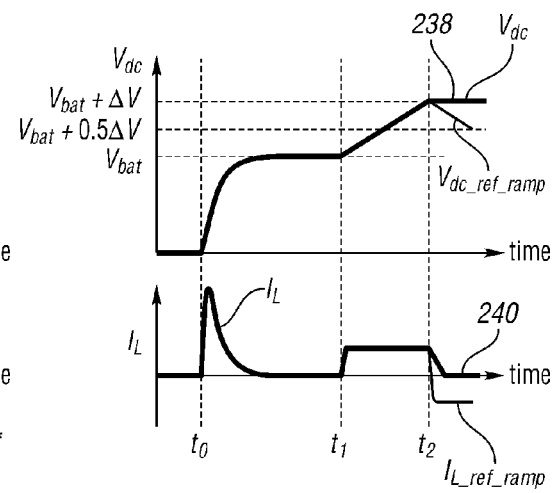
FIG. 9b is a portion of FIG. 4b, illustrated with signals corresponding to an open circuit within a transistor of the first switching unit or a defective gate drive circuit.
Figure 10A:
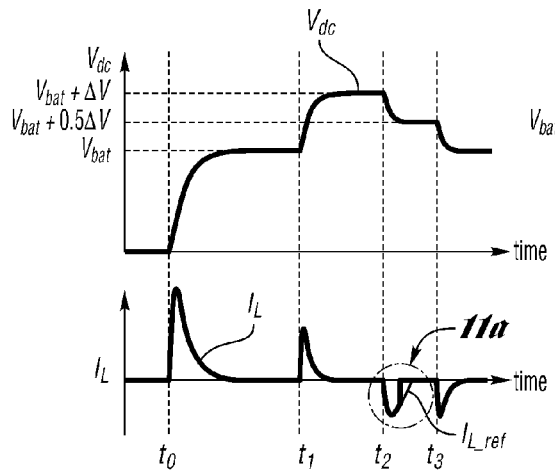
FIG. 10a is graph of FIG. 4a, illustrated with signals corresponding to an open circuit within a diode of the second switching unit.
Figure 10B:
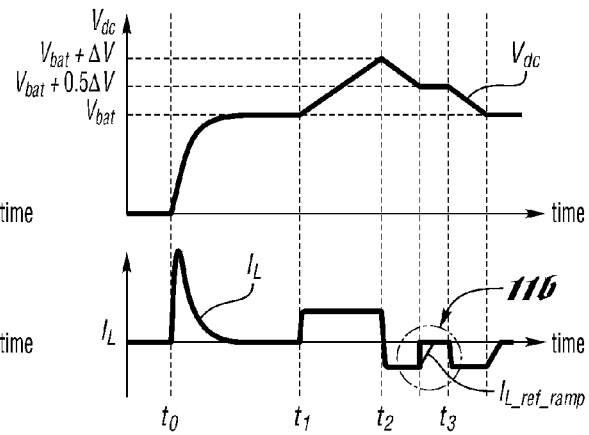
FIG. 10b is graph of FIG. 4b, illustrated with signals corresponding to an open circuit within a diode of the second switching unit.

The $V_{dc}$ and $I_L$ waveforms illustrated in FIGS. 9a and 9b are generally indicative of an open circuit within the first transistor 82. The waveforms from FIGS. 4a and 4b are associated with normal operating conditions and reproduced in FIGS. 9a and 9b, respectively, for reference purposes. At time ($t_2$), the TCM 58 commands the VVC 16 to provide an intermediate boost voltage. The TCM 58 provides control signals to the VVC 16 that corresponds to a voltage command value that is greater than the battery voltage and less than the boost voltage ($V_{cmd\_t2}=V_{bat}+0.5*\Delta V$). This portion of the test evaluates the bi-directional operation of the VVC 16. By decreasing the output voltage, from a boost voltage to an intermediate boost voltage, the current flows toward the main battery 52, as illustrated by the negative transient response of the $I_{L\_ref}$ and $I_{L\_ref}$ waveforms. Under normal operating conditions, the gate drive circuit 76 provides gate signals corresponding to $V_{cmd\_t2}$, which controls the switching units 78, 80 to collectively reduce the output voltage as shown in the reference waveforms ($V_{dc\_ref}$, $V_{dc\_ref\_ramp}$). However, if there is an open circuit within the first transistor 82, current will not pass through the first transistor 82. The output voltage does not decrease and the $V_{dc}$ waveform remains at ($V_{bat}+\Delta V$), as referenced by numeral 234. Since the voltage does not decrease, the current response does not change and the $I_L$ waveform remains at zero Amps, as referenced by numeral 236. The $V_{dc}$ and $I_L$ waveforms illustrated in FIG. 9b depict similar responses as those in 9a. The $V_{dc}$ waveform remains at ($V_{bat}+\Delta V$), as referenced by numeral 238, and the $I_L$ waveform remains at zero Amps, as referenced by numeral 240. Such a condition may also be associated with defective gate drive circuit 76 that only provides a "low" signal to the first transistor 82, which would have the same effect as an open circuit within the first transistor 82.

Figure 11A:
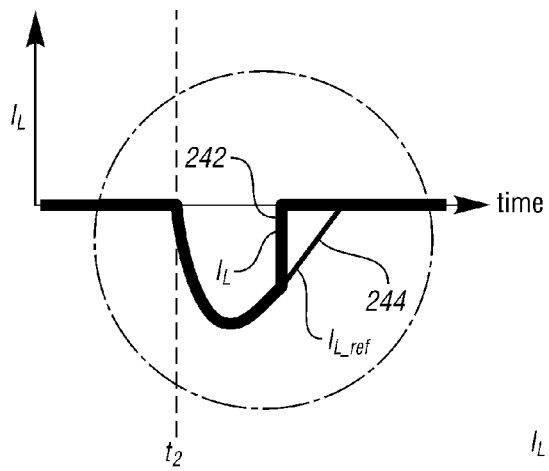
Figure 11B:
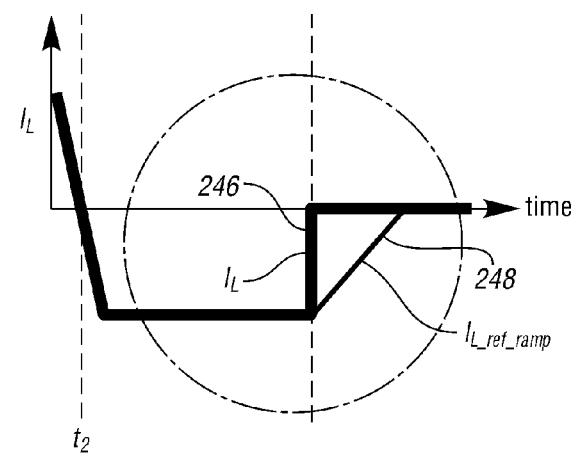
FIG. 11b is an enlarged portion of FIG. 10b.

FIGS. 10a-11b illustrate waveforms that are generally indicative of an open circuit within the second diode 88. The waveforms from FIGS. 4a and 4b are associated with normal operating conditions and are reproduced in FIGS. 10a, 11a, and 10b, 11b, respectively, for reference purposes. FIGS. 11a and 11b illustrate enlarged views of the encircled portions of FIGS. 10a and 10b, respectively. At time ($t_2$), the TCM 58 commands the VVC 16 to provide an intermediate boost voltage. The TCM 58 provides control signals to the VVC 16 that correspond to a voltage command value that is greater than the battery voltage and less than the boost voltage ($V_{cmd\_t2}=V_{bat}+0.5*\Delta V$). This portion of the test evaluates the bi-directional operation of the VVC 16. By decreasing the output voltage, from a boost voltage to an intermediate boost voltage, the input current flows toward the main battery 52, as illustrated by the negative transient response of the $I_{L\_ref}$ and $I_{L\_ref\_ramp}$ waveforms. Under normal operating conditions, the gate drive circuit 76 provides gate signals corresponding to $V_{cmd\_t2}$, which controls the switching units 78, 80 to collectively reduce the output voltage as shown in the reference waveforms ($V_{dc\_ref}$, $V_{dc\_ref\_ramp}$). The current freewheels to zero Amps through the second diode 88 after the second transistor 86 is turned off. However, if there is an open circuit within the second diode 88, the inductor current will drop to zero immediately after the second transistor 86 is turned off, as referenced by numeral 242, rather than the more gradual response associated with dissipation in the inductor 90, as referenced by numeral 244. Since the second diode 88 is open circuit, there is no freewheel path for the inductor current. This change in the current path does not affect the voltage response. The $V_{dc}$ and $I_L$ waveforms illustrated in FIGS. 10b and 11b depict similar responses as those in 10a and 11a. The $I_L$ waveform suddenly returns to zero Amps, as referenced by numeral 246 rather than the more gradual response associated with dissipation in the inductor 90, as referenced by numeral 248.

Figure 12:
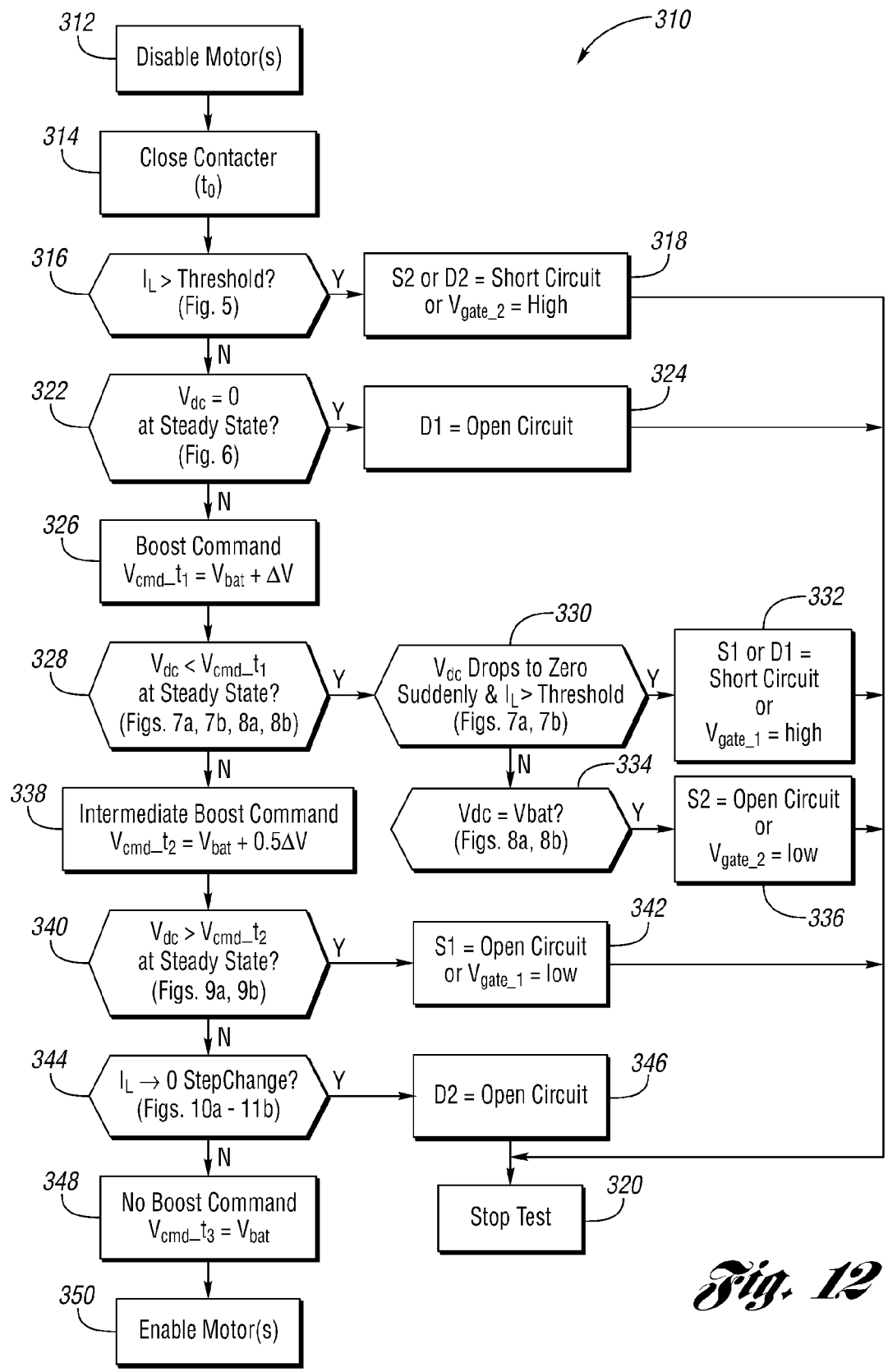
FIG. 12 is a flow chart illustrating a method for evaluating the performance of a VVC, according to one or more embodiments.

With reference to FIG. 12, a method for evaluating the performance of the VVC 16 is illustrated according to one or more embodiments and generally referenced by numeral 310. The method 310 is implemented using software code contained within the controller 14 according to one or more embodiments. In other embodiments, the method 310 is implemented in other vehicle controllers, or multiple vehicle controllers. In operation 312, the controller 14 disables the electric machines 18, 24 by opening switches within the inverter 56. In operation 314, the contactor 70 is closed, which corresponds to time $(t_0)$ in FIGS. 4a-11b. Battery power is now supplied to the VVC 16 and the controller 14 receives input signals ($V_{dc}$ and $I_L$).

At operation 316, the controller 14 compares $I_L$ to a threshold current value, as described with reference to FIG. 5. If $I_L$ is greater than the threshold current value, then the controller 14 determines that an overcurrent condition is present and proceeds to operation 318. At operation 318 the controller 14 sets a fault indicating that the second transistor (S2) or the second diode (D2) has a short circuit; or that the gate drive circuit is defective and is only providing a high gate signal to S2 ($V_{gate\_2}$=high). After operation 318, the controller 14 proceeds to operation 320 and stops the evaluation of the VVC 16. If the determination at operation 316 is negative, the controller proceeds to operation 322.

At operation 322, the controller 14 evaluates the steady state voltage response after time $(t_0)$, as described with reference to FIG. 6. If $V_{dc}$ is equal to approximately zero volts at steady state, then the controller 14 determines that the first diode (D1) has an open circuit and proceeds to operation 324 to set a corresponding fault. After operation 324, the controller 14 proceeds to operation 320 and stops the evaluation of the VVC 16. If the determination at operation 322 is negative, the controller proceeds to operation 326.

At operation 326, the controller 14 commands the VVC 16 to provide a boost voltage that is greater than the battery voltage, (e.g., $V_{cmd\_t1}=V_{bat}+\Delta V$). Next, at operation 328, the controller 14 compares the steady state voltage response of $V_{dc}$ to $V_{cmd\_t1}$. If $V_{dc}$ is less than $V_{cmd\_t1}$ at steady state, then the controller 14 determines there is a defect and proceeds to operation 330.

At operation 330 the controller 14 compares $V_{dc}$ to zero volts, and $I_L$ to a threshold current value, as described with reference to FIGS. 7a and 7b. If $V_{dc}$ at steady state is approximately equal to zero volts, and $I_L$ increases above the threshold current value then the controller 14 determines that there is a defect. The controller 14 determines that either the first transistor (S1) or the first diode (D1) has a short circuit; or that the gate drive circuit is defective and only providing a high gate signal to S1 ($V_{gate\_1}$=high). The controller 14 sets a corresponding fault at operation 332. After operation 332, the controller 14 proceeds to operation 320 and stops the evaluation of the VVC 16. If the determination at operation 330 is negative, the controller 14 proceeds to operation 334.

At operation 334 the controller 14 analyzes $V_{dc}$ to determine if $V_{dc}$ did not change in response to the boost command at operation 326, as described with reference to FIGS. 8a and 8b. If $V_{dc}$ did not change and is still approximately equal to $V_{bat}$, then the controller 14 determines that S2 has an open circuit, or that or that the gate drive circuit is defective and only providing a low gate signal to S2 ($V_{gate\_2}$=low), and sets a corresponding fault at operation 336. After operation 336, the controller 14 proceeds to operation 320 and stops the evaluation of the VVC 16. If the determination at operation 328 is negative, the controller 14 proceeds to operation 338.

At operation 338, the controller 14 commands the VVC 16 to provide an intermediate boost voltage (e.g., $V_{cmd\_t2}=V_{bat}+0.5*\Delta V$). Next, at operation 340, the controller 14 compares the steady state voltage response to $V_{cmd\_t2}$. If $V_{dc}$ is greater than $V_{cmd\_t2}$ at steady state, then the controller 14 determines that S has an open circuit; or that the gate circuit is defective and only providing a low gate signal to S1 ($V_{gate\_1}$=low), and sets a corresponding fault at operation 342. After operation 342, the controller 14 proceeds to operation 320 and stops the evaluation of the VVC 16. If the determination at operation 340 is negative, then the controller 14 proceeds to operation 344.

At operation 344, the controller 14 analyzes the current response after time $(t_2)$, as described with reference to FIGS. 10a-11b. The controller 14 analyzes the current response for the presence of a step change, where $I_L$ suddenly changes to zero Amps. If such a step change is detected, then the controller 14 determines that D2 has an open circuit, and sets a corresponding fault at operation 346. After operation 346, the controller 14 proceeds to operation 320 and stops the evaluation of the VVC 16. If the determination at operation 344 is negative, then the controller 14 proceeds to operation 348.

At operation 348, the controller 14 commands the VVC 16 to provide an output voltage corresponding to battery voltage, or no boost ($V_{cmd\_t3}=V_{bat}$). Then, the controller 14 stops the test, and enables the electric machines at operation 350. The controller 14 enables the first electric machine 18 and the second electric machine 24 by closing switches within the inverter 56 which allows electrical power to pass to the first electric machine 18 and the second electric machine 24.

If a defect is detected during any of the operations described above, the controller 14 may prevent vehicle propulsion by controlling the VVC 16 and the electric machines 18, 24 to disable drive torque. However, the controller 14 activates a limited operating strategy in response to certain hardware defects within the VVC 16, according to one or more embodiments.

For example, the controller 14 may activate a limited operating strategy of disabling VVC boost if it does not detect a fault until after operation 326. If there is no short circuit in the second switching unit (S2, D2) and no open circuit in the first diode (D1); but there is a short circuit in (S1 or D1) or an open circuit in (S1, S2, and/or D2), then the vehicle system 10 can disable the VVC 16 boost functionality. As described above with respect to time $(t_0)$, when both S1 and S2 are open, the current passes through D1, and the VVC 16 provides an output voltage that is equal to the battery voltage. Therefore, if the controller 14 determines that there is a short circuit in S1 or D1 in operation 332, then the controller 14 may disable VVC boost by controlling the VVC 16 to allow power to pass through the VVC 16 without boosting the voltage potential. Additionally, if the controller 14 determines that there is an open circuit in S1, S2 or D2, in operations 342, 336, or 346, respectively, the controller 14 may disable VVC boost. The electric machines 18, 24 are still operable as both motors and generators after the VVC boost is disabled; however they operate at a limited capacity.

With reference to FIG. 13, a method for evaluating the performance of the VVC 16 is illustrated according to one or more embodiments and generally referenced by numeral 410. The method 410 is similar to the method 310 described with reference to FIG. 12. However, the method 410 illustrated in FIG. 13 replaces some steady state voltage response analysis of method 310 (operations 322, 328 and 340) with transient current response analysis. Such changes decrease the overall time needed to evaluate/test the VVC 16, which may provide advantages in some implementations of the vehicle system 10.

At operation 412, the controller 14 disables the electric machines 18, 24 by opening switches within the inverter 56. In operation 414, the contactor 70 is closed, which corresponds to time ($t_0$) in FIGS. 4a-11b. Battery power is now supplied to the VVC 16 and the controller 14 receives input signals ($V_{dc}$ and $I_L$).

At operation 416, the controller 14 compares $I_L$ to a threshold current value, as described with reference to FIG. 5. If $I_L$ is greater than the threshold current value, then the controller 14 determines that an overcurrent condition is present and proceeds to operation 418. At operation 418 the controller 14 sets a fault indicating that the second transistor (S2) or the second diode (D2) has a short circuit; or that the gate drive circuit is defective and is only providing a high gate signal to S2 ($V_{gate\_2}$=high). After operation 418, the controller 14 proceeds to operation 420 and stops the evaluation of the VVC 16. If the determination at operation 416 is negative, the controller proceeds to operation 422.

At operation 422, the controller 14 evaluates the transient current response after time ($t_0$), as described with reference to FIG. 6. If the transient current response of $I_L$ is zero, and does not rapidly increase, then gradually decrease back to zero amps, then the controller 14 determines that the first diode (D1) has an open circuit and proceeds to operation 424 to set a corresponding fault. After operation 424, the controller 14 proceeds to operation 420 and stops the evaluation of the VVC 16. If the determination at operation 422 is negative, the controller proceeds to operation 426.

At operation 426, the controller 14 commands the VVC 16 to provide a boost voltage that is greater than battery voltage ($V_{cmd\_t1}=V_{bat}+\Delta V$). Next, at operation 428, the controller 14 compares $I_L$ to a threshold current value, and $V_{dc}$ to zero volts, as described with reference to FIGS. 7a and 7b. If $I_L$ increases above the threshold current value and $V_{dc}$ drops to approximately zero volts, then the controller 14 determines that there is a defect. The controller 14 determines that either the first transistor (S1) or the first diode (D1) has a short circuit; or that the gate drive circuit is defective and only providing a high gate signal to S1 ($V_{gate\_1}$=high). The controller 14 sets a corresponding fault at operation 430. After operation 430, the controller 14 proceeds to operation 420 and stops the evaluation of the VVC 16. If the determination at operation 428 is negative, the controller 14 proceeds to operation 432.

At operation 432 the controller 14 analyzes $I_L$ and $V_{dc}$ in response to $V_{cmd\_t1}$, as described with reference to FIGS. 8a and 8b. If the transient current response of $I_L$ is zero, and does not rapidly increase, then gradually decrease back to zero amps; and if $V_{dc}$ did not change and is still approximately equal to $V_{bat}$, then the controller 14 determines that S2 has an open circuit, or that the gate circuit is defective and only providing a low gate signal to S2 ($V_{gate\_2}$=low). The controller 14 sets a corresponding fault at operation 434. After operation 434, the controller 14 proceeds to operation 420 and stops the evaluation of the VVC 16. If the determination at operation 432 is negative, the controller 14 proceeds to operation 438.

At operation 438, the controller 14 commands the VVC 16 to provide an intermediate boost voltage that is greater than battery voltage, and less than the boost voltage (e.g., $V_{cmd\_t2}=V_{bat}+0.5*\Delta V$). Next, at operation 440, the controller 14 analyzes the transient current response to $V_{cmd\_t2}$. If the transient current response of $I_L$ is zero, and does not rapidly decrease, then gradually increase back to zero amps, then the controller 14 determines that S1 has an open circuit; or that the gate drive circuit is defective and only providing a low gate signal to S1 ($V_{gate\_1}$=low). The controller 14 sets a corresponding fault at operation 442. After operation 442, the controller 14 proceeds to operation 420 and stops the evaluation of the VVC 16. If the determination at operation 440 is negative, then the controller 14 proceeds to operation 444.

At operation 444, the controller 14 analyzes the current response after time ($t_2$), as described with reference to FIGS. 10a-11b. The controller 14 analyzes the current response for the presence of a step change, where $I_L$ suddenly changes to zero Amps. If such a step change is detected, then the controller 14 determines that D2 has an open circuit, and sets a corresponding fault at operation 446. After operation 446, the controller 14 proceeds to operation 420 and stops the evaluation of the VVC 16. If the determination at operation 444 is negative, then the controller 14 proceeds to operation 448.

At operation 448, the controller 14 commands the VVC 16 to provide an output voltage corresponding to the battery voltage, or no boost ($V_{cmd\_t3}=V_{bat}$). Then the controller 14 stops the test, and enables the motors at operation 450. The controller 14 enables the first electric machine 18 and the second electric machine 24 by closing switches within the inverter 56 which allows electrical power to pass to the first electric machine 18 and the second electric machine 24.

As such, the vehicle system 10 provides advantages over the prior art by evaluating the performance of the VVC 16 prior to vehicle propulsion. The vehicle system 10 is configured to identify a specific defective hardware component associated with the VVC 16. Based on the defective component, the VVC either disables power to the motor or activates a limited operating strategy.

While the best mode has been described in detail, those familiar with the art will recognize various alternative designs and embodiments within the scope of the following claims. Additionally, the features of various implementing embodiments may be combined to form further embodiments of the invention. While various embodiments may have been described as providing advantages or being preferred over other embodiments or prior art implementations with respect to one or more desired characteristics, those of ordinary skill in the art will recognize that one or more features or characteristics may be compromised to achieve desired system attributes, which depend on the specific application and implementation. These attributes may include, but are not limited to: cost, strength, durability, life cycle cost, marketability, appearance, packaging, size, serviceability, weight, manufacturability, ease of assembly, etc. The embodiments described herein that are described as less desirable than other embodiments or prior art implementations with respect to one or more characteristics are not outside the scope of the disclosure and may be desirable for particular applications.

What is claimed is:

1. A vehicle comprising:
    an electric machine configured to provide drive torque;
    a storage device for supplying power to the electric machine;
    a variable voltage converter (VVC) connected between the storage device and the electric machine; and
    a controller configured to:
        receive input indicative of a VVC input current and a VVC output voltage,
        selectively disable drive torque and provide output indicative of a specific defective solid state VVC component responsive to the input,
        provide a control signal indicative of an intermediate boost voltage command, wherein the intermediate boost voltage command corresponds to an intermediate voltage value that is greater than a storage device voltage value and less than a boost voltage value, provide output indicative of an open circuit within a first transistor of the VVC when the VVC output voltage corresponds to the boost voltage value in response to the intermediate boost voltage command, and disable VVC boost in response to the output by controlling the VVC to allow power to pass from the storage device to the electric machine without boosting the intermediate voltage value.

2. The vehicle of claim 1 further comprising:

a contactor connected between the storage device and the VVC, the contactor being configured to enable the storage device to supply power to the converter when the contactor is closed; and wherein the controller is further configured to:

provide output indicative of at least one of a short circuit within a second switching unit of the VVC and a defective gate drive circuit communicating with the second switching unit, when the VVC input current exceeds a predetermined threshold current value in response to the contactor being closed, and disable drive torque in response to the output.

3. The vehicle of claim 1 wherein the controller is further configured to:

provide a control signal indicative of a boost voltage command, wherein the boost voltage command corresponds to a boost voltage value that is greater than a storage device voltage value by a predetermined voltage difference;

provide output indicative of at least one of a short circuit within a first switching unit of the VVC and a defective gate drive circuit communicating with the first switching unit, when the VVC input current exceeds a predetermined threshold current value in response to the boost voltage command; and disable VVC boost in response to the output.

4. The vehicle of claim 3 wherein the controller is further configured to:

provide output indicative of an open circuit within a second transistor of the VVC when the VVC output voltage does not change in response to the boost voltage command.

5. The vehicle of claim 1 wherein the controller is further configured to:

provide output indicative of an open circuit within a second diode of the VVC when the VVC input current includes a step change to approximately zero Amps in response to the intermediate boost voltage command.

6. The vehicle of claim 1 further comprising:

an inverter connected between the VVC and the electric machine, the inverter being configured to receive DC power from the VVC and provide AC power to the electric machine, and to receive AC power from the electric machine and provide DC power to the VVC; and a gate drive circuit connected between the controller and the VVC, the gate drive circuit being configured to:

receive at least one control signal from the controller, amplify the control signal, and provide the control signal to the VVC for activating the VVC.

7. A vehicle system comprising:

a variable voltage converter (VVC) connected between a battery and an electric machine; and at least one controller configured to:

receive input indicative of at least one of a VVC input current and a VVC output voltage, provide a control signal indicative of an intermediate boost voltage command, wherein the intermediate boost voltage command corresponds to an intermediate voltage value that is greater than a battery voltage value and less than a boost voltage value, provide output indicative of at least one of an open circuit within a first transistor of the VVC and a defective gate drive circuit communicating with the first transistor, when the VVC output voltage corresponds to the boost voltage value in response to the intermediate boost voltage command, and disable VVC boost in response to the output by controlling the VVC to allow power to pass from the battery to the electric machine without boosting the intermediate voltage value.

8. The vehicle system of claim 7 wherein the controller is further configured to:

receive a key position signal indicative of a vehicle status; and evaluate VVC performance in response to a change in vehicle status from an off status to an on status.

9. The vehicle system of claim 7 wherein the controller is further configured to:

provide a control signal indicative of a boost voltage command, wherein the boost voltage command corresponds to a boost voltage value that is greater than a battery voltage value by a predetermined voltage difference; and provide output indicative of an open circuit within a second transistor of the VVC, when the VVC output voltage corresponds to the battery voltage in response to the boost voltage command.

10. The vehicle system of claim 7 wherein the controller is further configured to:

provide a control signal indicative of a boost voltage command, wherein the boost voltage command corresponds to a boost voltage value that is greater than a battery voltage value by a predetermined voltage difference; and provide output indicative of at least one of a short circuit within a first switching unit of the VVC and a defective gate drive circuit communicating with the first switching unit, when the VVC output voltage decreases to approximately zero Volts in response to the boost voltage command.

11. The vehicle system of claim 10 wherein the controller is further configured to:

provide a control signal indicative of an intermediate boost voltage command, wherein the intermediate boost voltage command corresponds to an intermediate voltage value that is greater than the battery voltage value and less than the boost voltage value; and provide output indicative of an open circuit within a second diode of the VVC, when the VVC input current includes a step change to approximately zero Amps in response to the intermediate boost voltage command.

12. A variable voltage converter (VVC) evaluation method comprising:

receiving input indicative of a VVC input current and a VVC output voltage; and providing output indicative of an open circuit within a second diode of the VVC, when the VVC input current step changes to approximately zero Amps in response to an intermediate boost voltage command corresponding to an intermediate boost voltage greater than a battery voltage value and less than a boost voltage value.

13. The method of claim 12 further comprising:
providing a control signal indicative of a boost voltage command, wherein the boost voltage command corresponds to a boost voltage value that is greater than the battery voltage value by a predetermined voltage difference; and
providing output indicative of an open circuit within a second transistor of the VVC, when the VVC output voltage corresponds to the battery voltage value in response to the boost voltage command.

14. The method of claim 12 further comprising:
providing a control signal indicative of a boost voltage command, wherein the boost voltage command corresponds to a boost voltage value that is greater than the battery voltage value by a predetermined voltage difference; and
providing output indicative of a short circuit within a first switching unit of the VVC, when the VVC output voltage decreases to approximately zero Volts in response to the boost voltage command.

15. The method of claim 12 further comprising:
providing a control signal indicative of the intermediate boost voltage command; and
providing output indicative of an open circuit within a first transistor of the VVC, when the VVC input current is greater than or equal to zero Amps in response to the intermediate boost voltage command.

16. The method of claim 12 further comprising:
enabling DC power to pass through the VVC without changing a voltage potential of the DC power, in response to the output indicative of an open circuit within the second diode.

17. The method of claim 12 further comprising:
controlling a contactor connected between the battery and the VVC to close; and
providing output indicative of an open circuit within a first diode of the VVC, when the VVC output voltage corresponds to zero volts in response to the closing of the contactor.

* * * * *